Patented Nov. 30, 1943

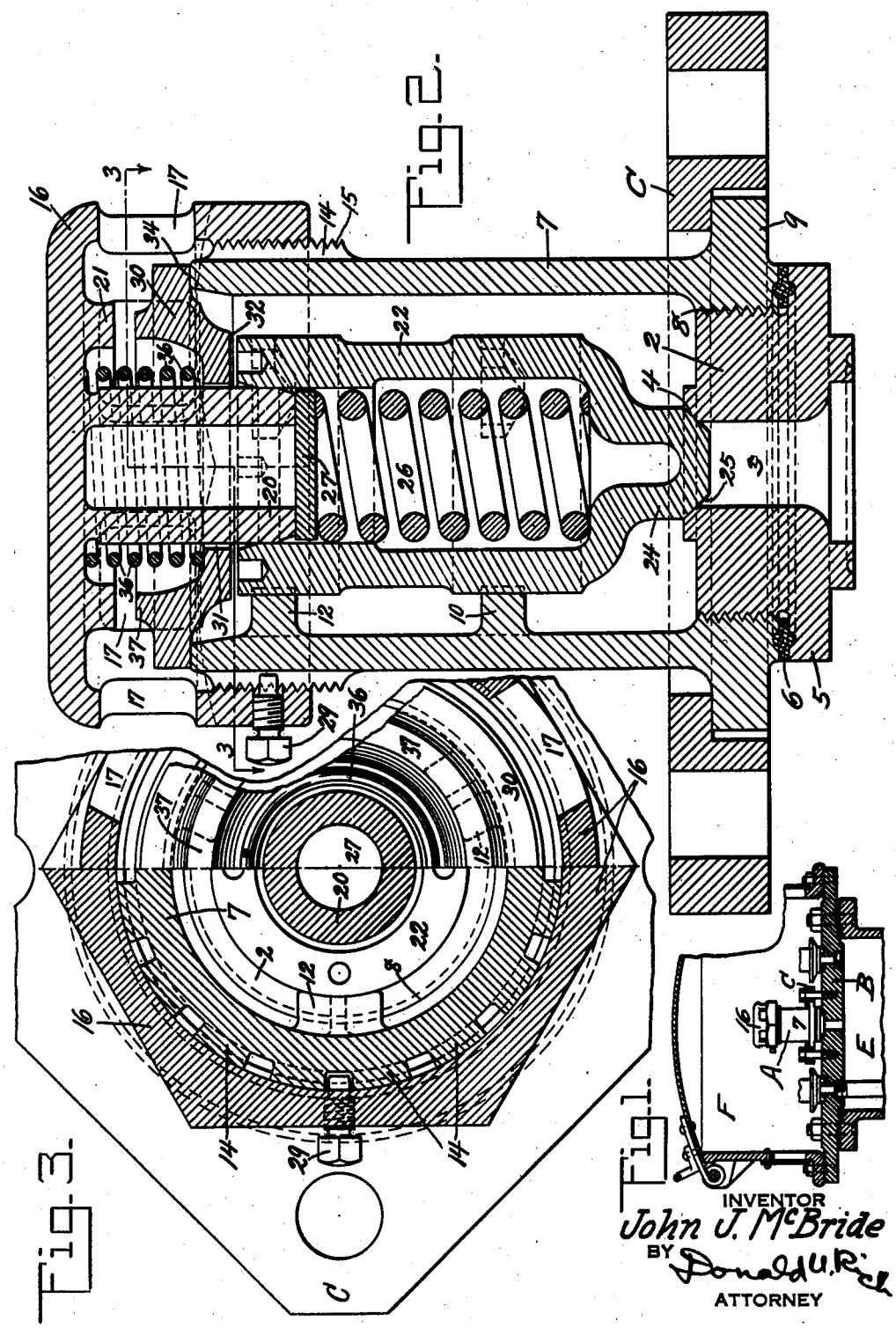

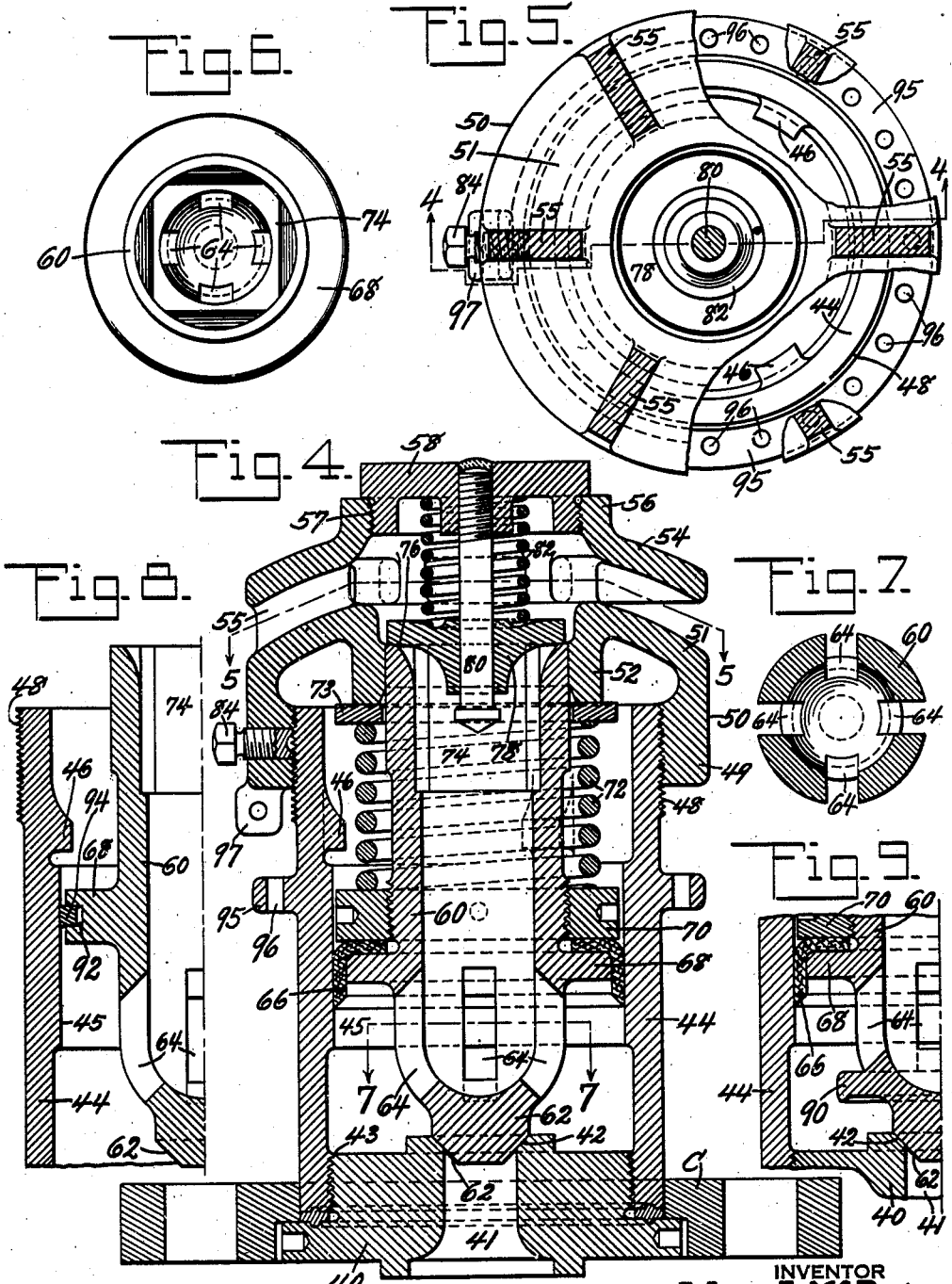

2,335,829

UNITED STATES PATENT OFFICE 2,335,829

PROTECTED SAFETY VALVE

John J. McBride, Bayonne, N. J., assignor to American Car and Foundry Company, New York, N. Y., a corporation of New Jersey Application September 23, 1941, Serial No. 411,962

10 Claims. (Cl. 277—70)

This invention relates to safety valves in general and in particular to safety valves for use on tank cars, which valves must be protected against entrance of grit, cinders, etc. In the transportation of poisonous gases by a tank car it is required that the safety valves be protected against entrance of foreign matter such as grit and cinders and also to retain a small amount of pressure above the main valve seat in order to prevent escape into the atmosphere of poisonous gases which may seep past the main valve. In the past this requirement has been met by using a lead disc sealing the valve above the valve seating surfaces, which disc would, of course, retain small pressures, while rupturing in case of heavy leakage or in case the safety valve operated. If, however, the safety valve operated or the lead disc was ruptured for any other reason, then there would be no protection and grit and cinders could enter the valve and eventually find their way into the valve seat or into spaces where they would pack and prevent operation of the valve. It is an object, therefore, of the present invention to provide a safety valve protected by an auxiliary valve arranged in tandem.

A further object of the invention is the provision of a safety valve having a main valve protected by an auxiliary valve, so arranged as to retain small amounts of pressure escaping past the main valve.

A still further object of the invention is the provision of a main safety valve protected by an auxiliary safety valve which will not hinder operation of the main valve, yet will always protect the main valve against entrance of dirt and grit.

Yet another object of the invention is the provision of a protected safety valve having valves arranged in tandem and with the springs of the valves normally acting together to retain the main valve seated.

These and other objects of the invention will be apparent to persons skilled in the art from a study of the following description and accompanying drawings, in which:

Fig. 1 is a partial sectional view through the top of the tank and showing the safety valve in position;

Fig. 2 is an enlarged sectional view through the improved safety valve;

Fig. 3 is a sectional view taken substantially on line 3—3 of Fig. 2;

Fig. 4 is a sectional view similar to Fig. 2 but showing a modification and taken substantially on line 4—4 of Fig. 5;

Fig. 5 is a sectional view taken substantially on line 5—5 of Fig. 4;

Fig. 6 is a plan view of the main valve of Fig. 4;

Fig. 7 is a sectional view taken substantially on line 7—7 of Fig. 4;

Fig. 8 is a partial sectional view showing a slight modification of the valve of Fig. 4, and Fig. 9 is a partial sectional view showing a still further slight modification of the valve of Fig. 4.

Referring now to the drawings in detail, it will be seen that the improved safety valve consists of an assembly portion A held in position upon the manhole cover B by bolting or securing ring C. The manhole cover is, of course, bolted or otherwise secured to the nozzle E of the tank, the remainder of which is not shown, while a manhole housing F is attached to the manhole cover and protects the various gauges, valves, etc., which are carried by the manhole cover.

In the construction shown in Figs. 2 and 3 the valve consists of a valve seat member 2, having opening 3 therethrough terminating in beveled surfaces 4, which surfaces are finished to provide the sealing seat. A flange 5 on the valve seat member is adapted to receive a packing member 6 squeezed into position when the valve seat member is screwed into the valve body 7 through coaction of the threads 8. The valve body is formed as a cylinder open at the top and bottom and provided adjacent the bottom with an external flange 9 adapted to be engaged by bolting ring C previously referred to. The body is also provided with spaced lower internal projections 10 and upper internal spaced projections 12, which projections have their inner ends finished to provide guides for the main valve later to be referred to. The valve body is also provided with upper spaced external projections 14 threaded as at 15 to receive a cap member 16. This cap member is internally threaded to cooperate with the threads on the valve body and is formed with a plurality of openings 17 extending through the side walls thereof to permit escape of gases from the valve body. The cap is formed with a centrally located annular projection 20 of a length substantially equal to the length of the side portions of the cap. Also, the cap is formed with a short annular projection 21 extending downwardly from the upper surface of the cap and in spaced relation to the central projection and the sides in order to provide a stop for the auxiliary valve later to be described.

The valve itself is made as a cylinder having sides 22 with finished portions adapted to coact with and to be guided by projections 10 and 12 of the valve body. The lower end of the valve is formed with a projecting part 24 finished to provide a sealing seat 25 cooperating with the sealing seat of the valve seat member to prevent leakage of material. In order to retain the main valve member upon the valve seat a main spring 26 is located internally of the main valve member and bears at its lower end upon said main valve member, while at its upper end it bears upon a washer 27 in engagement with projection 20 of the valve cap, thus it will be seen that by rotation of the valve cap 16 varying degrees of compression may be placed in main spring 26 and any desired amount of compression may then be retained by tightening dog ended set screw 29 extending through the side of the cap and into the spaces between external projections 14 of the valve body. It will be seen from Fig. 2 that the projection 20 extends into the inner portion of the main valve member 22 and accordingly aids the internal projections 10 and 12 in guiding the main valve member and will also prevent entrance of gases into the cavity occupied by the main valve spring 26.

In order to protect the main valve seating surfaces an auxiliary valve 30 is provided having a central opening 31 through which projection 20 of the valve cap may project. The auxiliary valve is provided with an area 32 adjacent opening 31, which area is machined or otherwise finished and adapted to cooperate with the upper finished end of main valve 22 when the main valve member is shifted upwardly by pressure in the tank. The auxiliary valve member is also provided with a second finished surface 34 adapted in the present case to cooperate with the upper finished end of the cylindrical valve body 7. The auxiliary valve is held in position by an auxiliary valve spring 36 bearing at its lower end upon the auxiliary valve and at its upper end upon the valve cap. Upward movement of the auxiliary valve as well as of the main valve is limited by an annular projection 37 on the auxiliary valve contacting annular projection 21 on the cap.

From the preceding description it will be seen that the main valve is held in position by spring 26, while the auxiliary valve is held in position by spring 36. With both of these springs adjusted by a common cap means 16, it will also be seen that normally the main valve is spaced from the auxiliary valve and, therefore, not acted upon by spring 36 but only by spring 26. As soon, however, as the main valve moves upwardly under pressure in the tank the upper finished surface will strike finished surface 32 of the auxiliary valve and prevent entrance of gases to the cavity occupied by spring 26. Continued upward movement of the main valve will raise the auxiliary valve until it is stopped by projection 21 of the cap 16. Preferably, the stop 21 and projection 37 have their contacting surfaces finished so as to seal and prevent entrance of gases to the cavity occupied by auxiliary spring 36. As soon as the pressure in the tank or vessel has been lowered sufficiently, the main valve will, under action of spring 26 combined with 36 through part of its movement, be shifted downwardly upon its seat. The auxiliary member will, of course, be seated under action of spring 36 and effectively prevent entrance of dirt or grit to the main valve or into the valve body. In case of slight leakage past the main valve, pressure would build up to a small amount in the valve body and such pressure would be relieved through the auxiliary valve moving upwardly sufficiently to relieve such internal pressure. Thus not only does the auxiliary valve protect the main valve against entrance of dirt, but also it protects against building up of excessive pressures tending to materially change the point at which the main valve would move under pressure in the tank or vessel.

In the valve construction shown in Figs. 4 to 7 inclusive the valve seat member 40 is provided with a discharge opening 41 terminating in a finished valve seat surface 42. The valve seat member is also provided with threads 43 adapted to cooperate with internal threads formed in the lower part of the valve body 44. The entire valve assembly is held in position by the bolting ring C which, in this case, engages the valve seat member directly, as clearly shown in Fig. 4. The valve body is formed as a cylinder open at both ends and having a portion of the internal surface finished to provide a cylinder bore 45 immediately below a set of internal stops 46. The upper end of the body is externally threaded as at 48 to receive cooperating internal threads formed in the side flanges 49 of cap 50. The cap is formed with a lower dome like portion 51 joined to the side flanges 49 and having the central portion thereof removed to provide an opening defined by downturned flanges 52 located in spaced relation to the outer flanges or sides of the cap 49. An upper portion 54 is formed on the cap and joined to the dome like lower portion by spaced ribs 55, thus providing in effect a plurality of passages between the upper and lower dome like portions for the discharge of material. The upper dome like portion of the cap is turned upwardly as at 56 and internally threaded as at 57 to receive a threaded cap 58.

The main valve member 60 is generally cylindrical in form and formed on its lower end with a valve seating portion 62 adapted to cooperate with the seat 42 of the valve seat member to seal the passage 41. As clearly shown, the main valve member has upwardly inclined ports 64 permitting passage of material from the outside of the valve member to the inside. The valve member is held in position in the valve body by means of a flexible cup diaphragm 66 riding in cylinder bore 45 of the valve body and firmly gripped between a flange 68 formed on the main valve and retaining washer 70 threaded on the main valve above the flange. The upper end of the main valve is finished and slides in finished surfaces of the downturned flanges 52 of the valve cap member. As clearly shown, the main valve is held in position by a main spring 72 bearing at its lower end upon retaining washer 70 and at its upper end upon a thrust washer 73 bearing upon the lower end of flange 52 of the cap. The upper end of the main valve member is internally squared as at 74 to receive a tool (not shown), by means of which the valve may be ground on its seat and in position in the valve body. Also, the upper end of the main valve is finished to cooperate with finished surface 76 of the auxiliary valve 78. This auxiliary valve is mounted for vertical sliding movement upon positioning bolt 80 fastened in the cap 58. This auxiliary valve is held in position by auxiliary valve spring 82 bearing at its lower end upon the auxiliary valve and at its upper end upon cap 58.

From the preceding description it will be seen that the main valve spring 72 and auxiliary valve spring 82 are in series and both constantly urge the main valve toward its seat. Adjustment of springs 72 and 82 may be simultaneously effected by rotation of the main cap 50 which may, after adjustment, be locked in position by set screw 84. If desired or necessary, spring 82 may be adjusted independently of spring 72 by rotation of cap 58, thus controlling the point at which the auxiliary valve will release. In this form of valve when pressure builds up in the tank or vessel tending to move the main valve from its seat, the main valve will shift upwardly carrying with it the auxiliary valve. As soon as the pressure escaping past the main valve seat and ports 64 reach the auxiliary valve, it will in turn be raised from its seat and the pressure may then discharge to atmosphere through the openings in the cap. Entrance of the escaping material into the cavity occupied by spring 72 is prevented by the sealing cup or diaphragm 66 as well as by the finished surface between flanges 52 and the main valve member. As soon as pressure in the vessel has been relieved, the main valve will be urged downwardly toward its seat under action of spring 72. As soon as this valve has closed or substantially closed, the pressure in the interior of the main valve will drop permitting the auxiliary valve to be seated under action of its spring 82. Thus it will be seen that the main valve must lift against the resistance of springs 72 and 82 and will be seated under the action of spring 72 alone, thereby providing a differential in pressure between the opening and closing points.

In some cases the differential obtained by use of springs 72 and 82 may not be sufficient to give proper operation of the valve, in which case a flange 90 may be formed as shown in Fig. 9 on the main valve to provide a huddling chamber to produce proper operation of the valve. In some instances it will be found that the cup or diaphragm 66 will not function properly, in which case the flange 68 of the main valve is grooved as at 92 (Fig. 8) to receive a ring 94 of a type similar to that used in automotive engines. It will be noted that in the form of the valve shown in Fig. 4 the valve body is formed with a ring like flange 95 having numerous holes 96 therein to receive a seal wire (not shown) extending therethrough and through a hole in lug 97 formed on the cap, thereby protecting against unauthorized tampering with the valve setting.

While the invention has been described with reference to particular forms, it will be obvious to persons skilled in the art that various modifications and rearrangements of parts, other than those shown and described, may be made and all such modifications and rearrangements of parts are contemplated as will fall within the scope of the appended claims defining my invention.

What is claimed is:

1. In a safety valve adapted to be attached to a tank or other container, a valve body provided with a valve seat, a main valve member movable within said body and adapted to engage said valve seat, a cap adjustably secured to said valve body and so formed as to provide guide means directly contacting said main valve member, resilient means compressed between a part of said cap and said main valve member and urging the latter into engagement with said valve seat, a second valve seat over which all matter passing said first named valve seat must flow, said second valve seat being protected by said cap and located substantially in line with said first named valve seat, an auxiliary valve movable with respect to said second valve seat, resilient means compressed between said cap and said auxiliary valve and urging the latter onto the second named valve seat, said main valve member and auxiliary valve normally resting on their seats and together controlling the escape of matter under pressure from the tank or other container.

2. In a safety valve adapted to be attached to a tank or other container, a valve body provided with vertically spaced valve seats, a main valve member movable within said body and adapted to engage the lower of said seats, an auxiliary valve member adapted to engage the upper of said seats, a cap adjustably secured to the valve body and so formed as to provide guide means directly contacting said main valve member, and independent resilient means reacting on said cap and normally and independently holding said valve members on their seats.

3. In a safety valve adapted to be attached to a tank or other container, a valve body provided with vertically spaced valve seats, a main valve member movable within said body and adapted to engage the lower of said seats, an auxiliary valve member adapted to engage the upper of said seats, a cap adjustably secured to the valve body, and independent resilient means reacting on said cap and normally holding said valve members on their seats, said valve members and cap being formed with cooperating seating surfaces preventing contact of matter with said resilient means when said valve members are raised from their seats by pressure of matter in the tank or container.

4. In a safety valve adapted to be attached to a tank or other container, a valve body, vertically spaced valve seats within said valve body, a main valve member movable within said body and adapted to engage the lower of said seats, an auxiliary valve member adapted to engage the upper of said seats, a cap adjustably secured to the valve body and so formed as to provide guide means directly contacting said main valve member, and independent resilient means reacting on said cap and normally holding said valve members on their seats against the pressure of matter in the tank or other container, said valve members together controlling the escape of matter under pressure from the tank or other container and said auxiliary valve alone controlling the escape of matter under pressure from the valve body.

5. In a safety valve adapted to be attached to a tank or other container, a valve body, vertically spaced valve seats within said valve body, a main valve member movable within said body and adapted to engage the lower of said seats, an auxiliary valve member adapted to engage the upper of said seats, a cap adjustably secured to the valve body and so formed as to provide guide means directly contacting said main valve member, and independent resilient means reacting on said cap and normally holding said valve members on their seats, said main valve member controlling the escape of matter under pressure from the tank to the valve body interior, and said auxiliary valve member controlling the escape of matter under pressure from the valve body interior and the entrance of foreign matter into the valve body interior.

6. In a safety valve adapted to be attached to a tank, a valve body provided in its lower portion with a valve seat, a hollow main valve member guided in said body and adapted to engage said seat, a cap adjustably secured to said body and formed with a central projection extending into said hollow main valve member to additionally guide the latter, resilient means housed in said valve member and reacting on said projection and valve member to force the latter onto the valve seat, an auxiliary valve surrounding and guided by said projection, and cooperating valve seats formed on said auxiliary valve and on the upper end of said valve body whereby said auxiliary valve may control entrance and exit of matter to and from the valve body interior.

7. In a safety valve adapted to be attached to a tank, a valve body provided with a valve seat, a hollow main valve member guided by said valve body and adapted to engage said valve seat, ports in the main valve giving access to the valve interior, a valve seat formed on the upper end of said main valve, and an auxiliary valve adapted to engage said last named valve seat and control passage of matter out of and into said main valve.

8. In a safety valve adapted to be attached to a tank, a valve body provided with a valve seat, a hollow main valve member guided by said valve body and adapted to engage said valve seat, ports in the main valve giving access to the valve interior, a valve seat formed on the upper end of said main valve, an auxiliary valve adapted to engage said last named valve seat and control passage of matter out of and into said main valve, and a plurality of resilient means normally holding said valves on their respective seats, one of said resilient means normally assisting the other resilient means in retaining the main valve upon its seat.

9. In a safety valve adapted to be attached to a tank, a valve body provided with a valve seat, a hollow main valve member guided by said valve body and adapted to engage said valve seat, ports in the main valve giving access to the valve interior, a cap adjustably secured to said valve body and formed with an inner central opening closely engaging and guiding the upper end of said hollow main valve, a valve seat formed on the upper end of said hollow main valve, means projecting downwardly from the central portion of said cap, and an auxiliary valve guided by said means and normally resting upon said last named valve seat to exclude foreign matter from the main valve member.

10. In a safety valve adapted to be attached to a tank, a valve body provided with a valve seat, a hollow main valve member guided by said valve body and adapted to engage said valve seat, a cap adjustably secured to said valve body and formed with a part closing the space between said body and the outside of said hollow main valve member, said part being formed with an opening closely engaging and guiding the upper end of said main valve, resilient means reacting on said cap part and on said main valve to normally hold the latter upon its seat, means preventing contact of matter escaping from the tank with said resilient means when said main valve is raised from its seat, ports formed in the main valve and giving access to the valve interior, a valve seat formed on the upper end of said hollow main valve, an internal projection carried by said cap centrally thereof, an auxiliary valve guided by said projection and adapted to engage said last named valve seat, and resilient means reacting on said cap and auxiliary valve to normally hold the same upon its seat.

JOHN J. McBRIDE.